Jan. 20, 1925.
F. W. HARRIS
GAS AND OIL SEPARATOR
Filed Dec. 12, 1922
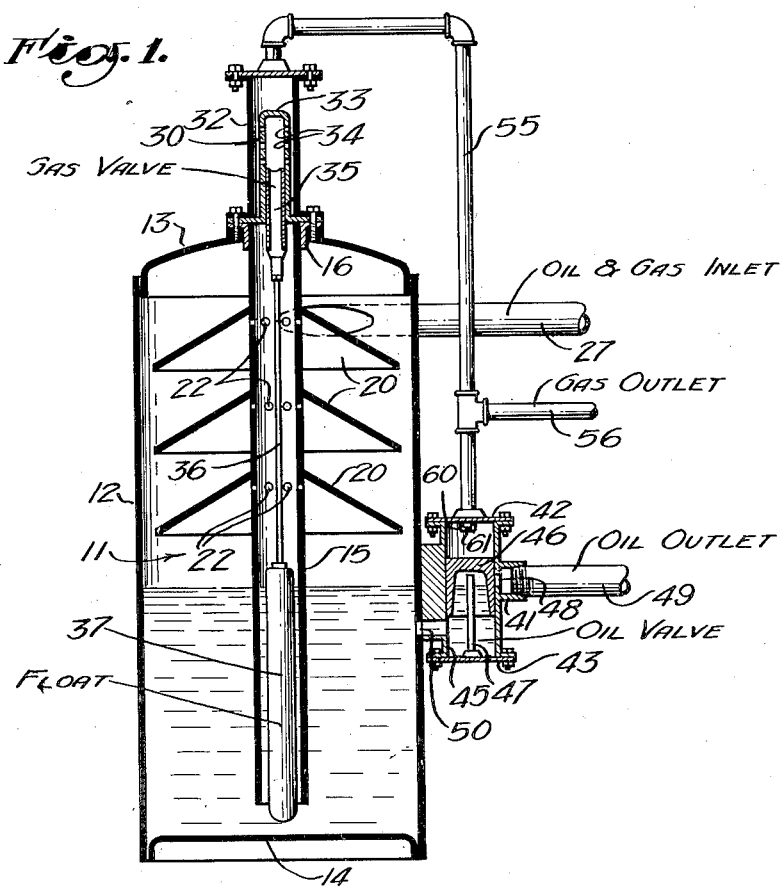
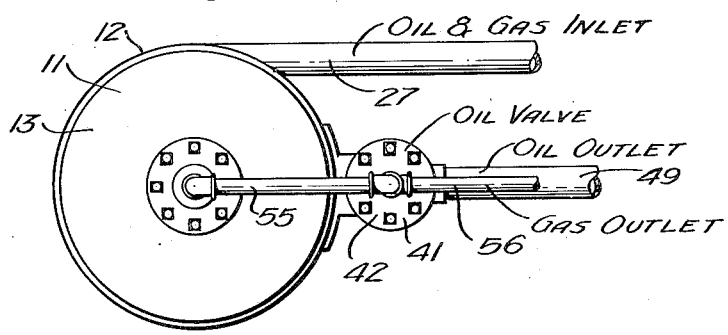

Patented Jan. 20, 1925.

1,523,773

UNITED STATES PATENT OFFICE.

FORD W. HARRIS, OF LOS ANGELES, CALIFORNIA.

GAS AND OIL SEPARATOR.

Application filed December 12, 1922. Serial No. 606,396.

*To all whom it may concern:*

Be it known that I, FORD W. HARRIS, a citizen of the United States, residing at Los Angeles, in the county of Los Angeles, State of California, have invented a new and useful Improvement in Gas and Oil Separators, of which the following is a specification.

My invention relates to the art of producing crude petroleum. In this art, oil wells are sunk into the oil sand and in the case of flowing wells, this oil is then expelled from the well under some pressure, containing considerable quantities of gas. This gas is now a valuable product, not only on account of the fixed gas which is its principal constituent, but also on account of the fact that such gas also carries considerable quantities of gasoline vapor which can be readily separated from the fixed gas by suitable and well known means. If the oil from the well is allowed to flow into open tanks or sumps, this gas and gasoline vapor escapes into the air and is lost. It is, therefore, highly desirable to separate from the oil the mixture of fixed gas and gasoline vapor, this mixture being hereinafter referred to for the sake of simplicity as "gas." It is an object of my invention to provide a device by which this result may be accomplished.

There have been devised various forms of gas and oil separators or "gas traps," as they are called in the oil fields, which are well suited to accomplish this object and there are several types of such gas traps now in general use in those fields where gas traps are necessary. All of the traps which are now in general use, with which I am familiar, comprise essentially a gas tight container into which the mixture of oil and gas is delivered from the oil well. Inside the container are various forms of baffle plates or surfaces designed to effect an efficient separation of the oil and gas. My invention is adapted to be used with any form of such separating surface, that shown being simply a convenient and practical means for effecting such a separation.

In what may be termed the conventional type of gas trap, as exemplified by several traps now in general use, there is also provided an oil valve which is placed in the oil outlet pipe and which is operated by a float which is raised or lowered by the oil in the trap, the valve being opened as the oil level rises, and closed as the oil level falls. The function of the oil valve is to maintain in the bottom of the trap a sufficient volume of oil to insure a seal so that no gas will escape through the oil outlet. The operation of such valves from floats is attended with some difficulties since the floats are liable to leak and thus become ineffective and, in any case, the power exerted by such a float is necessarily rather limited, it being due wholly to the displacement of the float less its weight. It is a further object of my invention to provide an oil outlet valve which is pressure operated and so arranged that it will have a very great excess of operating power over any possible resistance that it may meet. This pressure may consist of friction or may be due to the presence of sand or other foreign matter in the trap and valve.

Further objects and advantages will be made evident hereinafter.

Referring to the drawings, which are for illustrative purposes only,

Fig. 1 is an elevation partly in section of one embodiment of my invention, and

Fig. 2 is a plan view of the same embodiment.

In the form of separator or gas trap shown, I provide a container 11 consisting of a shell 12 having a tight top 13 and a tight bottom 14. Projecting downwardly into the center of the separator is a pipe 15 which is open at the bottom and top, being secured by means of a flange 16 to the top 13. On the outside of the pipe 15 are a series of imperforate cones 20 which are so placed that oil and gas entering through a pipe 27 are delivered preferably tangentially on the upper cone 20 flowing downwardly thereover and being delivered thereby onto the inner surface of the shell 12 over which the mixture flows in a thin film, the gas separating from the oil and ascending under the cones 20 and entering the central pipe 15 through holes 22 therein. The lower cones serve to keep the oil on the inner surface of the shell 12. The tangential inlet and the cone arrangement are old in the art and are merely one way of separating the gas and oil in their flow through the trap.

Secured to the top of the flange 16 is a gas valve 30 which projects up into a gas valve casing 32. The sleeve 30 has a closed upper end, as shown at 33, and is perforated by small holes 34. Sliding inside the sleeve 30 is a valve 35 which has holes projecting axially therethrough so that any pressure thereon is balanced. The valve 35 is operated through a valve stem 36 by means of a float 37. The parts 30 to 37 are so arranged that as the oil level in the trap rises, the float 37 lifts the valve 35 closing off the holes 34 until in its extreme upper position all the holes 34 are entirely closed and the full well pressure may be exerted to build up pressure in the trap.

The flow of oil from the trap is controlled by means of an oil valve 40 which consists of a casing 41 having heads 42 and 43 at its upper and lower ends. The interior of the casing 41 has a central bore 45 in which a piston 46 is free to slide vertically. In its lower position, the piston 46 rests on a stud 47. In this lower position, the piston 46 entirely covers and closes a port 48 in the wall of the bore 45, which port 48 is in open communication with an oil outlet pipe 49. The bottom of the bore 45 and the space below the piston 46 is in open communication at all times with the inside of the container 11 through an opening 50 cut in the shell 12.

The space above the piston 46 is always in open communication with the interior of the valve casing 32 through a pipe 55 which is also at all times in open communication with a gas outlet pipe 56. This pipe may deliver the gas to any desired point of utilization. The pipe 56 may be at any desired pressure as will be explained hereinafter.

The method of operation is as follows:

Prior to putting the trap into service, the parts assume the position shown in Fig. 1, the float being in its extreme lower position and thus holding the valve 35 in its lower position. In this position, the holes 34 are wide open and there is very little resistance to the passage of gas through the sleeve 30. The piston 46 is also in its lower position due to its weight and the oil port 48 is closed. The oil and gas, therefore, enter the trap through the pipe 21 and the oil and gas are separated, the oil flowing into the bottom of the trap and the gas flowing off through the pipe 55. As the trap fills with oil, however, the oil lifts the float 37 and gradually moves the valve 35 upwardly, closing the holes 34 until a pressure is built up in the trap due to the resistance to the flow of gas arising from the closing of the holes 34. If the holes 34 are entirely closed, the full well pressure may be exerted on the surface of the oil in the trap.

The piston 46 is subjected to this pressure which tends to lift the valve 46 and thus uncover the port 48. This tendency to lift is resisted by the weight of the piston 46 and the pressure of gas on the top thereof through the pipe 55. In actual service, the pressure inside the trap is built up by the closing of the valve 35 until it is just sufficient to lift the valve 46 and allow oil to escape. The escape of oil lowers the oil level and opens the valve 35 thus reducing the pressure in the trap and partially opening the valve 46 until a balanced condition is reached. In this condition, the valve 35 is partially closed to a sufficient degree to hold enough pressure on the trap to float the valve 46 in a sufficiently opened condition to maintain the proper level for this degree of opening of the valve 35. Any increase in the amount of oil delivered to the trap will then result in an increase in the opening of the valve 46 and any increase in the amount of gas will result in an increase in the opening of the valve 35.

In some cases, it is desirable to deliver the gas through the pipe 56 under pressure which may vary from one or two pounds to two hundred pounds per square inch. By connecting the top of the casing 41 with the pipe 55, any desired pressure can be carried in the pipe 56 without affecting the operation of the valve 46. It will be noted that this valve 46 operated due to the difference in pressure above and below the piston 46, which difference in pressure is the difference inside and outside the sleeve 30. This difference in pressure is regulated by the valve 35. I prefer to make the opening of the pipe 55 into the bore 45 of a constricted form which can be accomplished by putting a pipe plug 60 in the opening, this plug having a small hole 61 therein. By using this constricted opening, the space above the piston acts as a dash pot to prevent rapid movement or churning of the valve especially after sufficient oil has leaked past the piston into this space to provide a body of oil therein.

It will be evident that by suitable proportioning of the parts, a very positive acting device can be produced. If, for example, the piston 46 has an area of forty square inches, a difference of pressure of ten pounds will exert a pressure of four hundred pounds tending to lift the piston. The piston can then be made to weigh two hundred pounds and there will be a total force of two hundred pounds tending to close the valve when the pressure is balanced and a pressure of a like amount tending to raise the valve when there is an unbalanced pressure of ten pounds per square inch thereon. In such a valve, we would have two hundred pounds as a maximum tending to open or close the valve in either direction if such a pressure were necessary. This is a pressure that it is hard to obtain with floats except by the use of complicated lever systems and then only at the expense of valve travel.

By the use of my invention, I am able to provide a long stroke, high power valve that will act positively even in the presence of sand or other foreign matter, and which uses only the very light and direct acting float 37 which controls the gas valve. In the event the valve 46 sticks in its lower position, the pressure in the trap may build up to several times ten pounds per square inch and the pressure tending to lift the valve will build up until there may be a thousand pounds or more thereon thus insuring a positive opening of the oil valve under emergency conditions.

I claim as my invention:

1. An oil and gas separator comprising: a gas tight container; means for introducing a mixture of oil and gas into said container; a gas outlet pipe for withdrawing gas from said container; an oil outlet pipe for withdrawing oil from said container; a gas valve in said gas outlet pipe for controlling the flow of gas therethrough; means for closing said gas valve as the oil level rises in said container; an oil valve in said oil outlet pipe; and means by which any increase in pressure in said container above a predetermined minimum opens said oil valve.

2. An oil and gas separator as in claim 1 in which the means for closing the gas valve as the oil level rises in said container comprises: a float so placed as to be lifted by the oil in said container; and means connecting said float with the gas valve.

3. An oil and gas separator as specified in claim 1 in which the oil valve comprises: a casing in open communication with the interior of said container; a pressure actuated member in said casing; and means cooperating with said member to shut off the flow of oil from said casing as the pressure in said casing falls below the predetermined minimum.

4. An oil separator comprising: a container provided with an oil and gas inlet, a gas outlet and an oil outlet; a gas outlet valve governed by the amount of oil in said container; and an oil outlet valve governed by the gas pressure in said container.

5. An oil separator comprising: a container provided with an oil and gas inlet, a gas outlet and an oil outlet; a gas outlet valve governed by the amount of oil in said container; an oil outlet valve governed by the gas pressure in said container, and by the pressure of the discharged gas which resists the opening movement thereof.

6. An oil separator comprising: a container provided with an oil and gas inlet, an oil outlet, and a gas outlet; a gas outlet valve governed by the amount of oil in said container; a valve in said oil outlet governed by the gas pressure in said container; a gas discharge pipe leading from said gas outlet; and a pipe leading from said discharge pipe into the casing of said oil outlet valve at the side of the valve closure member opposite the side at which oil passes from said container into said casing.

7. An oil separator comprising: a container provided with an oil and gas inlet, an oil outlet, and a gas outlet; a gas outlet valve governed by the amount of oil in said container; a valve in said oil outlet governed by the gas pressure in said container; a gas discharge pipe leading from said gas outlet; and a pipe leading from said discharge pipe into the casing of said oil outlet valve at the side of the valve closure member opposite the side at which oil passes from said container into said casing, said latter pipe being constricted.

In testimony whereof, I have hereunto set my hand at Los Angeles, in the county of Los Angeles, this 5th day of December, 1922.

FORD W. HARRIS.